United States Patent
Chen (10) Patent No.: US 9,867,141 B2
(45) Date of Patent: Jan. 9, 2018

(54) HOT SPOT DEVICE HAVING POWER CONTROL FUNCTION AND POWER CONTROL METHOD

(71) Applicant: HON HAI PRECISION INDUSTRY CO., LTD., New Taipei (TW)

(72) Inventor: I-Chun Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/605,970

(22) Filed: May 26, 2017

(65) Prior Publication Data
US 2017/0347323 A1    Nov. 30, 2017

(30) Foreign Application Priority Data

May 28, 2016 (CN) .......................... 2016 1 0360475

(51) Int. Cl.
| | | |
|---|---|---|
| H04W 72/08 | (2009.01) |
| H04W 52/26 | (2009.01) |
| H04W 28/02 | (2009.01) |
| H04W 52/24 | (2009.01) |
| H04W 72/04 | (2009.01) |
| H04W 52/34 | (2009.01) |
| H04B 17/336 | (2015.01) |
| H04B 17/318 | (2015.01) |
| H04W 52/36 | (2009.01) |
| H04W 88/04 | (2009.01) |
| H04L 27/36 | (2006.01) |

(52) U.S. Cl.
CPC ........ *H04W 52/241* (2013.01); *H04B 17/318* (2015.01); *H04B 17/336* (2015.01); *H04W 52/367* (2013.01); *H04L 27/36* (2013.01); *H04W 88/04* (2013.01)

(58) Field of Classification Search
CPC ...... H04W 84/12; H04W 88/08; H04W 8/005
See application file for complete search history.

(56) References Cited

U.S. PATENT DOCUMENTS

| 2011/0013569 | A1* | 1/2011 | Scherzer | H04W 48/14 370/329 |
| 2014/0213219 | A1* | 7/2014 | Mohebbi | H04W 92/02 455/411 |
| 2015/0098429 | A1* | 4/2015 | Xiang | H04W 52/16 370/329 |

(Continued)

*Primary Examiner* — Bobbak Safaipour
(74) *Attorney, Agent, or Firm* — Steven Reiss (57) ABSTRACT

A radio communications power control method which can be applied in a hot spot device acquires a first signal power and a first noise power of a first channel by which the hot spot device communicates with a base station, and calculates a first signal-to-noise ratio between the first signal power and the first noise power. The device acquires a second signal power and a second noise power of the first channel when the hot spot device functions, and calculates a second signal-to-noise ratio between the second signal power and the second noise power. A difference is calculated between the first signal-to-noise ratio and the second signal-to-noise ratio, and if the second ratio is greater than the first ratio by a preset reference value, a power of the electromagnetic wave of the hot spot device is reduced to a target value.

15 Claims, 5 Drawing Sheets

(56) References Cited

U.S. PATENT DOCUMENTS

| | | | |
|---|---|---|---|
| 2015/0215832 A1* | 7/2015 | Fitzpatrick | H04W 48/18 455/426.1 |
| 2015/0282195 A1* | 10/2015 | Farhadi | H04W 72/085 370/229 |
| 2016/0014127 A1* | 1/2016 | Mohebbi | H04W 12/06 455/411 |
| 2016/0081031 A1* | 3/2016 | Barriac | H04W 52/0261 370/311 |
| 2016/0278093 A1* | 9/2016 | Negus | H04W 76/025 |

* cited by examiner

| Signal modulation mode | Preset reference value | Preset adjustment value |
|---|---|---|
| QPSK | First preset reference value | First preset adjustment value |
| 16QAM | Second preset reference value | Second preset adjustment value |
| 64QAM | Third preset reference value | Third preset adjustment value |

FIG. 4

FIG. 5

HOT SPOT DEVICE HAVING POWER CONTROL FUNCTION AND POWER CONTROL METHOD

CROSS-REFERENCE TO RELATED APPLICATIONS

This application claims priority to Chinese Patent Application No. 201610360475.0 filed on May 28, 2016, the contents of which are incorporated by reference herein.

FIELD

The subject matter herein generally relates to communication field, especially relates to a hot spot device having power control function and power control method.

BACKGROUND

A WI-FI device, such as smart phone, not only connects to the internet through a nearby base station, but also serves as a hot spot by which another smart phone can connect to the internet. However, when the smart phone serves as a hot spot, the information transmission between the smart phone and the base station can be degraded by interference.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
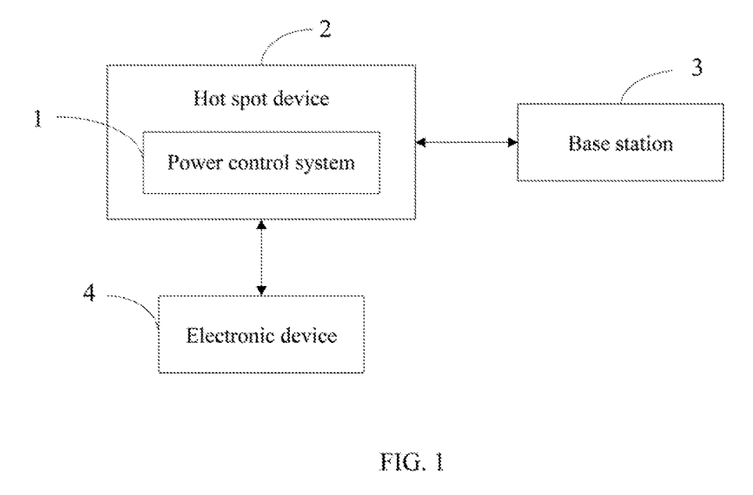
FIG. 1 is a block diagram of an embodiment of a running environment of a power control system.

FIG. 1 illustrates a running environment of a power control system 1. The system 1 is applied in a hot spot device 2, a base station 3, and at least one electronic device 4. The hot spot device 2 communicates with the base station 3 and connects to the internet through the base station 3. The hot spot device 2 has a radio communications relay function (hot spot function). When the hot spot device 2 opens the hot spot function, the hot spot device 2 can connect to the at least one electronic device 4. In at least one embodiment, the at least one electronic device 4 include wireless network card. When the hot spot device 2 opens the hot spot function, the hot spot device 2 outputs an electromagnetic wave of a certain power. When the at least one electronic device 4 having network card receives the wave, the at least one electronic device 4 can connect to the internet through the hot spot device 2. In at least one exemplary embodiment, the power of the electromagnetic wave output by the hot spot device 2 is more than a power threshold to make the at least one electronic device 4 connect to the internet through the hot spot device 2. The power threshold is the value of the minimum power required to make the hot spot device 2 work. In at least one exemplary embodiment, the power of the electromagnetic wave output by the hot spot device is in a range of 0 dbm-15 dbm. The power threshold is 0 dbm.

In at least one exemplary embodiment, the hot spot device 2 communicates with the bases station 3 through a first channel. The first channel includes, but is not limited to, 2300 MHz to 2400 MHz band, 2496 MHz to 2690 MHz band, and 2500 MHz to 2570 MHz band. The first channel corresponds to a signal-to-noise ratio threshold. To make the hot spot device 2 communicate with the base station 3 through the first channel, a signal-to-noise ratio of signal transmitted by the first channel is more than the signal-to-noise ratio threshold. The hot spot device 2 communicates with the at least one electronic device 4 through a second channel. The second channel includes, but is not limited to, 2402 MHz to 2482 MHz band. In at least one exemplary embodiment, the hot spot device 2 can be a smart phone, a tablet computer, or a notebook. The at least one electronic device 4 can be a smart phone or a tablet computer.

Figure 2:
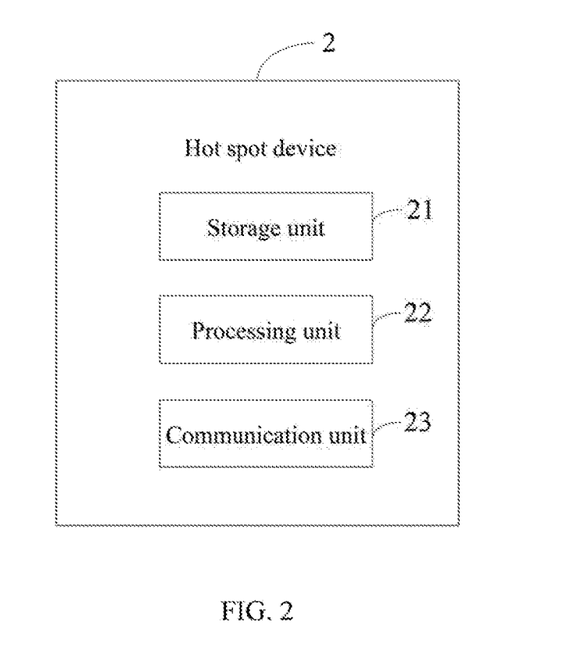
FIG. 2 is a block diagram of an embodiment of a hot spot device.

FIG. 2 illustrates the hot spot device 2. In at least one exemplary embodiment, the hot spot device 2 includes, but is not limited to, a storage unit 21, a processing unit 22, and a communication unit 23. The storage unit 21 is used to store data of the hot spot device 2. In at least one exemplary embodiment, the storage unit 21 can include various types of non-transitory computer-readable storage mediums. For example, the storage unit 21 can be an internal storage system of the hot spot device 2, such as a flash memory, a random access memory (RAM) for temporary storage of information, and/or a read-only memory (ROM) for permanent storage of information. In another embodiment, the storage unit 21 can also be an external storage system, such as a hard disk, a storage card, or a data storage medium. In at least one embodiment, the processing unit 22 can be a central processing unit (CPU), a microprocessor, or other data processor chip that performs functions of the power control system 1. The hot spot device 2 communicates with the base station 3 through the communication unit 23. In at least one exemplary embodiment, the communication unit 23 can be a WI-FI communication module, a BLUETOOTH communication module, or 3G/4G communication module.

Figure 3:
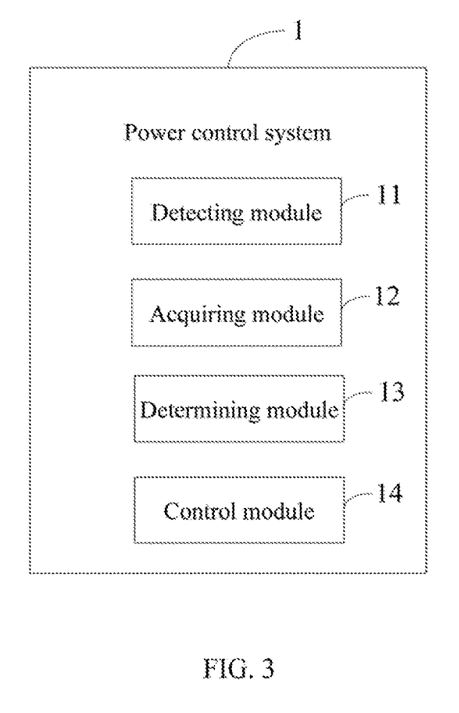
FIG. 3 is a block diagram of an embodiment of the system of FIG. 1.

FIG. 3 illustrates the power control system 1. In at least one embodiment, the system 1 includes a detecting module 11, an acquiring module 12, a determining module 13, and a control module 14. The modules 11-14 of the system 1 can be collections of software instructions. In at least one exemplary embodiment, the software instructions of the detecting module 11, the acquiring module 12, the determining module 13, and the control module 14 are stored in the storage unit 21 and executed by the processing unit 22.

The detecting module 11 is used to detect whether the hot spot device 2 communicates with the base station 3 through the communication unit 23.

The acquiring module 12 acquires a first signal power of the first channel and a first noise power of the first channel when the hot spot device 2 communicates with the base station 3, and calculates a first signal-to-noise ratio between the first signal power and the first noise power. Acquiring a signal power and a noise power of a channel is known to prior art.

The detecting module 11 further detects whether the hot spot device 2 opens the hot spot function. The acquiring module 12 further acquires a second signal power of the first channel and a second noise power of the first channel when the hot spot device 2 opens the hot spot function, and calculates a second signal-to-noise ratio between the second signal power and the second noise power.

The determining module 13 is used to determine whether the second signal-to-noise ratio is less than the first signal-to-noise ratio.

The control module 14 is used to set the power of the electromagnetic wave output by the hot spot device 2 as equal to the power threshold when the second signal-to-noise ratio is less than the first signal-to-noise ratio. The control module 14 further calculates a difference between the first signal-to-noise ratio and the second signal-to-noise ratio when the second signal-to-noise ratio is not less than the first signal-to-noise ratio. The control module 14 compares the calculated difference with a preset reference value. The control module 14 further reduces the power of the electromagnetic wave to a target value when the calculated difference between the first signal-to-noise ratio and the second signal-to-noise ratio is more than the preset reference value. In at least one exemplary embodiment, the target value equals the calculated difference between the first signal-to-noise ratio and the second signal-to-noise ratio plus a preset adjustment value. The control module 14 makes no change to the power of the electromagnetic wave when the calculated difference is not more than the preset reference value. In at least one embodiment, the preset reference value is used to measure loss of the signal-to-noise ratio of the first channel after the hot spot device 2 opens the hot spot function. The greater the preset reference value, the greater is the loss of the signal-to-noise ratio of the first channel. The less the value of the preset reference, the less is the loss of the signal-to-noise ratio of the first channel.

Figure 4:
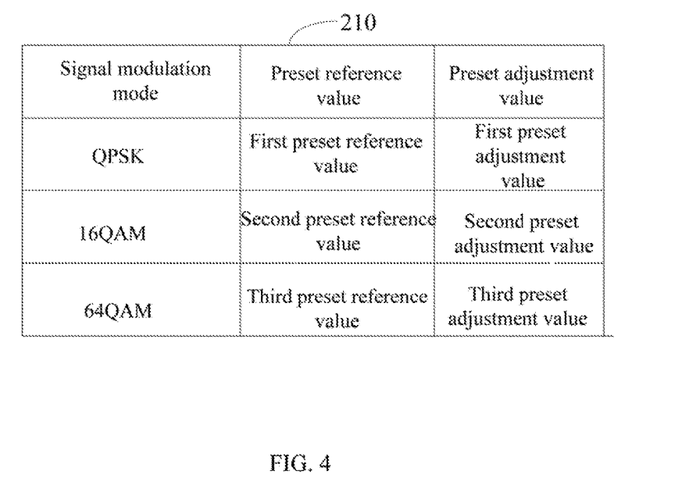
FIG. 4 is a diagrammatic view of a relationship table of the system of FIG. 1.

In at least one exemplary embodiment, the preset reference value and the preset adjustment value correspond to a modulation mode of signal transmitted between the hot spot device 2 and the base station 3 through the first channel. Specifically, the preset reference value and the preset adjustment value correspond to a signal modulation mode of the first channel. FIG. 4 illustrates a relationship table 210. The relationship table 210 is stored in the storage unit 21. The relationship table 210 defines a relationship among the signal modulation mode, the preset reference value, and the preset adjustment value. The signal modulation mode includes Quadrature Phase Shift Keying (QPSK), 16 Quadrature Amplitude Modulation (16QAM), and 64 Quadrature Amplitude Modulation (64QAM). The QPSK signal modulation mode corresponds to a first preset reference value and a first preset adjustment value. In at least one exemplary embodiment, the first preset reference value can be 0.5db, the first preset adjustment value can be in range of 0db-15db. The 16QAM signal modulation mode corresponds to a second preset reference value and a second preset adjustment value. In at least one exemplary embodiment, the second preset reference value can be 1.7db, the second preset adjustment value can be in range of 0db-15db. The 64QAM signal modulation mode corresponds to a third preset reference value and a third preset adjustment value. In at least one exemplary embodiment, the third preset reference value can be 2.5db, the third preset adjustment value can be in range of 0db-15db.

In at least one exemplary embodiment, the control module 14 acquires the signal modulation mode of the first channel when the second signal-to-noise ratio is not less than the first signal-to-noise ratio, and determines the preset reference value and the preset adjustment value from the relationship table 210 according to the acquired signal modulation mode. The determining module 13 calculates the difference between the first signal-to-noise ratio of the first channel and the second signal-to-noise ratio of the first channel, and compares the difference with the preset adjustment value corresponding to the signal modulation mode of the first channel. When the difference is more than the preset reference value corresponding to the signal modulation mode of the first channel, the control module 14 further reduces the power of the electromagnetic wave output by the hot spot device 2 to the target value. The target value equals the difference plus the preset adjustment value corresponding to the signal modulation mode of the first channel. When the difference is not more than the preset reference value, the control module 14 makes no change to the power of the electromagnetic wave.

For example, when the signal modulation mode of the first channel is QPSK, the control module 14 determines the first preset reference value and the first preset adjustment value from the relationship table 210 corresponding to the QPSK signal modulation mode. The determining module 13 calculates the difference between the first signal-to-noise ratio of the first channel and the second signal-to-noise ratio of the first channel, and compares the difference with the first preset adjustment value. When the difference is more than the first preset reference value, the control module 14 further reduces the power of the electromagnetic wave output by the hot spot device 2 to the target value, which is equal to the difference plus the first preset adjustment value. When the difference is not more than the preset reference value, the control module 14 makes no change to the power of the electromagnetic wave.

The hot spot device 2 of the present disclosure can reduce the power of the electromagnetic wave output by the hot spot device 2 to a target value when the difference between the first signal-to-noise ratio and the second signal-to-noise ratio is more than the preset reference value. Thus, the signal-to-noise ratio of the first channel is increased to improve the information transmission rate between the hot spot device 2 and the base station 3.

Figure 5:
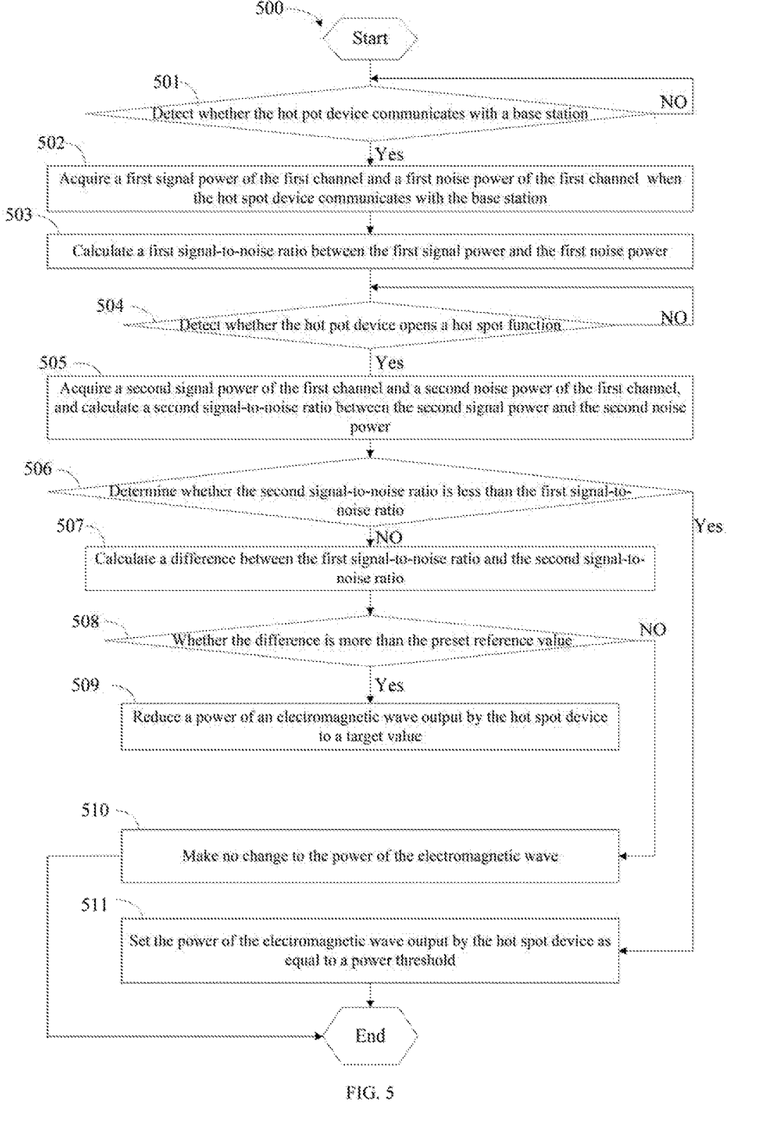
FIG. 5 is a flowchart of an embodiment of a power control method.

FIG. 5 illustrates a flowchart of an embodiment of a power control method 500. The method 500 is provided by way of example, as there are a variety of ways to carry out the method 500. The method 500 described below can be carried out using the configurations illustrated in FIGS. 1-4, for example, and various elements of these figures are referenced in explaining the example method 500. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method 500 can begin at block 501.

At block 501, control a hot spot device to detect whether the hot spot device communicates with a base station through a communication unit. If the hot spot device communicates with the base station, the method 500 executes block 502, otherwise, the method executes block 501.

At block 502, the hot spot device acquires a first signal power of the first channel and a first noise power of the first channel when the hot spot device communicates with the base station, wherein the hot spot device communicates with the base station by the first channel.

At block 503, the hot spot device calculates a first signal-to-noise ratio between the first signal power and the first noise power.

At block 504, the hot spot device detects whether the hot spot device opens a hot spot function. If the hot spot device opens the hot spot function, the method 500 executes block 505, otherwise, the method executes block 504.

At block 505, the hot spot device acquires a second signal power of the first channel and a second noise power of the first channel when the hot spot device opens the hot spot function, and calculates a second signal-to-noise ratio between the second signal power and the second noise power.

At block 506, the hot spot device determines whether the second signal-to-noise ratio is less than the first signal-to-noise ratio. If the second signal-to-noise ratio is less than the first signal-to-noise ratio, the method executes block 511, otherwise the method executes block 507.

At block 507, the hot spot device calculates a difference between the first signal-to-noise ratio and the second signal-to-noise ratio when the second signal-to-noise ratio is not less than the first signal-to-noise ratio.

At block 508, the hot spot device compares the calculated difference with a preset reference value. If the difference is more than the preset reference value, the method 500 executes the block 509, otherwise, the method 500 executes block 510. In at least one exemplary embodiment, the preset reference value is used to measure loss of the signal-to-noise ratio of the first channel after the hot spot device opens the hot spot function. The greater the preset reference value, the greater is the loss of the signal-to-noise ratio of the first channel. The less the value of the preset reference, the less is the loss of the signal-to-noise ratio of the first channel.

At block 509, the hot spot device reduces a power of an electromagnetic wave output by the hot spot device to a target value when the difference is more than the preset reference value. In at least one exemplary embodiment, the preset reference value equals the difference plus a preset adjustment value.

At block 510, the hot spot device makes no change to the power of the electromagnetic wave when the difference is not more than the preset reference value.

At block 511, the hot spot device sets the power of the electromagnetic wave output by the hot spot device as equal to a power threshold when the second signal-to-noise ratio is less than the first signal-to-noise ratio. Wherein, the power threshold is the value of the minimum power required to make the hot spot device work.

In at least one exemplary embodiment, the method 500 further includes: the hot spot device acquires a signal modulation mode of the first channel when the second signal-to-noise ratio is not less than the first signal-to-noise ratio, determines the preset reference value and the preset adjustment value from a relationship table defining a relationship among the signal modulation mode, the preset reference value, and the preset adjustment value corresponding to the acquired signal modulation mode, calculates the difference between the first signal-to-noise ratio of the first channel and the second signal-to-noise ratio of the first channel, compares the difference with the preset adjustment value corresponding to the signal modulation mode of the first channel, reduces the power of the electromagnetic wave output by the hot spot device to the target value when the difference is more than the preset reference value corresponding to the signal modulation mode of the first channel. The target value equals the difference plus the preset adjustment value corresponding to the signal modulation mode of the first channel.

In at least one exemplary embodiment, the method 500 further includes: when the difference is not more than the preset reference value, the hot spot device makes no change to the power of the electromagnetic wave.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A hot spot device having a hot spot function, outputting an electromagnetic wave of a power when the hot spot function of the hot spot device is open, the hot spot device comprising:
   a communication unit;
   a processing unit coupled to the communication unit;
   a non-transitory storage medium coupled to the processing unit and configured to store a plurality of instructions, which causes the hot spot device to:
   detect whether the hot spot device communicates with a base station through the communication unit;
   acquire a first signal power of a first channel and a first noise power of the first channel when the hot spot device communicates with the base station, wherein the hot spot device communicates with the base station by the first channel;
   calculate a first signal-to-noise ratio between the first signal power and the first noise power;

detect whether the hot spot device opens the hot spot function;
acquire a second signal power of the first channel and a second noise power of the first channel when the hot spot device opens the hot spot function;
calculate a second signal-to-noise ratio between the second signal power and the second noise power;
determine whether the second signal-to-noise ratio is less than the first signal-to-noise ratio;
calculate a difference between the first signal-to-noise ratio and the second signal-to-noise ratio when the second signal-to-noise ratio is not less than the first signal-to-noise ratio;
compare the calculated difference with a preset reference value; and
reduce the power of the electromagnetic wave to a target value when the calculated difference between the first signal-to-noise ratio and the second signal-to-noise ratio is more than the preset reference value.

2. The hot spot device as recited in claim 1, wherein the plurality of instructions is further configured to cause the hot spot device to make no change to the power of electromagnetic wave when the calculated difference is not more than the preset reference value.

3. The hot spot device as recited in claim 1, wherein the plurality of instructions is further configured to cause the hot spot device to:
set the power of the electromagnetic wave output by the hot spot device as equal to a power threshold when the second signal-to-noise ratio is less than the first signal-to-noise ratio, wherein the power threshold is the value of the minimum power required to make the hot spot device work.

4. The hot spot device as recited in claim 1, wherein the target value equals the calculated difference between the first signal-to-noise ratio and the second signal-to-noise ratio plus a preset adjustment value.

5. The hot spot device as recited in claim 4, wherein the plurality of instructions is further configured to cause the hot spot device to:
acquire a signal modulation mode of the first channel when the second signal-to-noise ratio is not less than the first signal-to-noise ratio; and
determine the preset reference value and the preset adjustment value from a relationship table according to the acquired signal modulation mode, wherein the relationship table defines a relationship among the signal modulation mode, the preset reference value, and the preset adjustment value.

6. The hot spot device as recited in claim 5, wherein the signal modulation mode comprises a Quadrature Phase Shift Keying, a 16 Quadrature Amplitude Modulation, and a 64 Quadrature Amplitude Modulation.

7. The hot spot device as recited in claim 3, wherein the power of electromagnetic wave output by the hot spot device is in a range of 0 dbm-15 dbm, and the power threshold is 0 dbm.

8. The hot spot device as recited in claim 2, wherein the hot spot device can be a smart phone, a tablet computer, or a notebook.

9. A power control method, applied in a hot spot device with a hot spot function, the hot spot device outputting an electromagnetic wave of a power when the hot spot function of the hot spot device is open, the method comprising:
detect whether the hot spot device communicates with a base station through a communication unit;
acquire a first signal power of a first channel and a first noise power of the first channel when the hot spot device communicates with the base station, wherein the hot spot device communicates with the base station by the first channel;
calculate a first signal-to-noise ratio between the first signal power and the first noise power;
detect whether the hot spot device opens the hot spot function;
acquire a second signal power of the first channel and a second noise power of the first channel when the hot spot device opens the hot spot function;
calculate a second signal-to-noise ratio between the second signal power and the second noise power;
determine whether the second signal-to-noise ratio is less than the first signal-to-noise ratio;
calculate a difference between the first signal-to-noise ratio and the second signal-to-noise ratio when the second signal-to-noise ratio is not less than the first signal-to-noise ratio;
compare the calculated difference with a preset reference value; and
reduce the power of the electromagnetic wave to a target value when the calculated difference between the first signal-to-noise ratio and the second signal-to-noise ratio is more than the preset reference value.

10. The method as recited in claim 9, further comprising:
make no change to the power of electromagnetic wave when the calculated difference is not more than the preset reference value.

11. The method as recited in claim 9, further comprising:
set the power of the electromagnetic wave output by the hot spot device as equal to a power threshold when the second signal-to-noise ratio is less than the first signal-to-noise ratio, wherein the power threshold is the value of the minimum power required to make the hot spot device work.

12. The method as recited in claim 9, wherein the target value equals the calculated difference between the first signal-to-noise ratio and the second signal-to-noise ratio plus a preset adjustment value.

13. The method as recited in claim 12, further comprising:
acquire a signal modulation mode of the first channel when the second signal-to-noise ratio is not less than the first signal-to-noise ratio; and
determine the preset reference value and the preset adjustment value from a relationship table according to the acquired signal modulation mode, wherein the relationship table defines a relationship among the signal modulation mode, the preset reference value, and the preset adjustment value.

14. The method as recited in claim 13, wherein the signal modulation mode comprises a Quadrature Phase Shift Keying, a 16 Quadrature Amplitude Modulation, and a 64 Quadrature Amplitude Modulation.

15. The method as recited in claim 11, wherein the power of electromagnetic wave output by the hot spot device is in a range of 0 dbm-15 dbm, and the power threshold is 0 dbm.

* * * * *